(12) United States Patent
Okuda

(10) Patent No.: US 11,656,424 B2
(45) Date of Patent: May 23, 2023

(54) OPTICAL APPARATUS

(71) Applicant: CANON KABUSHIKI KAISHA, Tokyo (JP)

(72) Inventor: Toshihiro Okuda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 17/066,533

(22) Filed: Oct. 9, 2020

(65) Prior Publication Data

US 2021/0116671 A1 Apr. 22, 2021

(30) Foreign Application Priority Data

Oct. 18, 2019 (JP) .............................. JP2019-190709

(51) Int. Cl.
*G02B 7/02* (2021.01)
*G02B 7/09* (2021.01)
*G02B 7/08* (2021.01)

(52) U.S. Cl.
CPC ............. *G02B 7/02* (2013.01); *G02B 7/022* (2013.01); *G02B 7/08* (2013.01); *G02B 7/09* (2013.01)

(58) Field of Classification Search
CPC . G02B 7/282; G03B 3/10; G03B 5/02; G03B 2205/0069; H01F 7/066; H01F 7/081; H01F 7/17; H01F 2007/086; H04N 5/225
See application file for complete search history.

(56) References Cited

U.S. PATENT DOCUMENTS

| 9,798,104 B2 | 10/2017 | Kobayashi |
| 9,897,774 B2 | 2/2018 | Kobayashi |
| 2008/0068728 A1 | 3/2008 | Westerweck |

(Continued)

FOREIGN PATENT DOCUMENTS

| CN | 204883016 U | 12/2015 |
| JP | 2002258139 A | 9/2002 |

(Continued)

OTHER PUBLICATIONS

Office Action issued in Japanese Appln. No. 2019-190709 dated Oct. 19, 2021. English translation provided.

*Primary Examiner* — Darryl J Collins
*Assistant Examiner* — Tamara Y. Washington
(74) *Attorney, Agent, or Firm* — Rossi, Kimms & McDowell LLP

(57) ABSTRACT

An optical apparatus includes holders configured to hold on a base member a third holding member that holds a third optical element among a plurality of optical elements, and provided at three locations in a circumferential direction around an optical axis when viewed from an optical axis direction, or a holder configured to holding the base member on another member. Where first, second, and third axes pass through the optical axis and holders at the three locations, a first driver and a first guide member are disposed in a first area between the first axis and the second axis, and a second driver and a second guide member are disposed in a second area between the first axis and the third axis. The first driver and second driver are disposed in two areas that at least partially overlap each other in the optical axis direction.

18 Claims, 6 Drawing Sheets

(56) References Cited

U.S. PATENT DOCUMENTS

2013/0235471 A1* 9/2013 Yagi ................ G02B 7/102
                                                  359/697
2016/0291285 A1* 10/2016 Park ................ H04N 5/2254
2020/0225441 A1    7/2020 Kishimoto
2021/0294067 A1*  9/2021 Park ................ G02B 7/08

FOREIGN PATENT DOCUMENTS

| JP | 2005284144 A | 10/2005 |
| JP | 2006178006 A | 7/2006 |
| JP | 2018146993 A | 9/2018 |
| JP | 2018189936 A | 11/2018 |
| JP | 2019103336 A | 6/2019 |
| WO | 2014208195 A1 | 12/2014 |
| WO | 2016051617 A1 | 4/2016 |
| WO | 2019064942 A1 | 4/2019 |

* cited by examiner

OPTICAL APPARATUS

BACKGROUND OF THE INVENTION

Field of the Invention

The present invention relates to an optical apparatus that moves a plurality of lens units for zooming, focusing, etc.

Description of the Related Art

In order to reduce the shortest imaging distance and to improve the image quality in close-up imaging, a plurality of lens units may be moved during focusing. Japanese Patent Laid-Open No. ("JP") 2005-284144 discloses an optical apparatus that arranges a plurality of drivers (actuators) for moving a plurality of lens units, respectively, on a straight line parallel to an optical axis. PCT International Publication No. ("WO") 16/051617 discloses an optical apparatus that arranges a plurality of actuators for moving a plurality of lens units, respectively, on the same circle centered at the optical axis in a plane orthogonal to the optical axis.

It is necessary to widely space the plurality of actuators aligned in the optical axis direction as in JP 2005-284144 if the lens units are widely spread in the optical axis direction. Then, a compact structure of the optical apparatus is hindered. In addition, when a plurality of actuators are aligned in the circumferential direction as in WO 16/051617 and another fixed lens unit is disposed among the lens units that are driven by these actuators, it becomes difficult to secure a phase area for holding the fixed unit.

SUMMARY OF THE INVENTION

The present invention provides a compact optical apparatus having a plurality of actuators (drivers) for driving a plurality of lens units.

An optical apparatus according to one aspect of the present invention includes a plurality of optical elements arranged in an optical axis direction, a first holding member and a second holding member configured to hold a first optical element and a second optical element, respectively, among the plurality of optical elements, a first guide member and a second guide member configured to guide movements of the first holding member and the second holding member, respectively, in the optical axis direction, a first driver and a second driver configured to drive the first holding member and the second holding member, respectively, in the optical axis direction, a base member configured to hold the first driver and second driver, and holders configured to cause the base member to hold a third holding member that holds a third optical element among the plurality of optical elements, or configured to cause another member to hold the base member, and provided at three locations in a circumferential direction around an optical axis when the optical apparatus is viewed from the optical axis direction. Where a first axis, a second axis, and a third axis are defined as axes passing through the optical axis and the holders at the three locations, the first driver and the first guide member are disposed in a first area between the first axis and the second axis, and the second driver and the second guide member are disposed in a second area between the first axis and the third axis. The first driver and second driver are disposed in two areas that at least partially overlap each other in the optical axis direction.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 2:
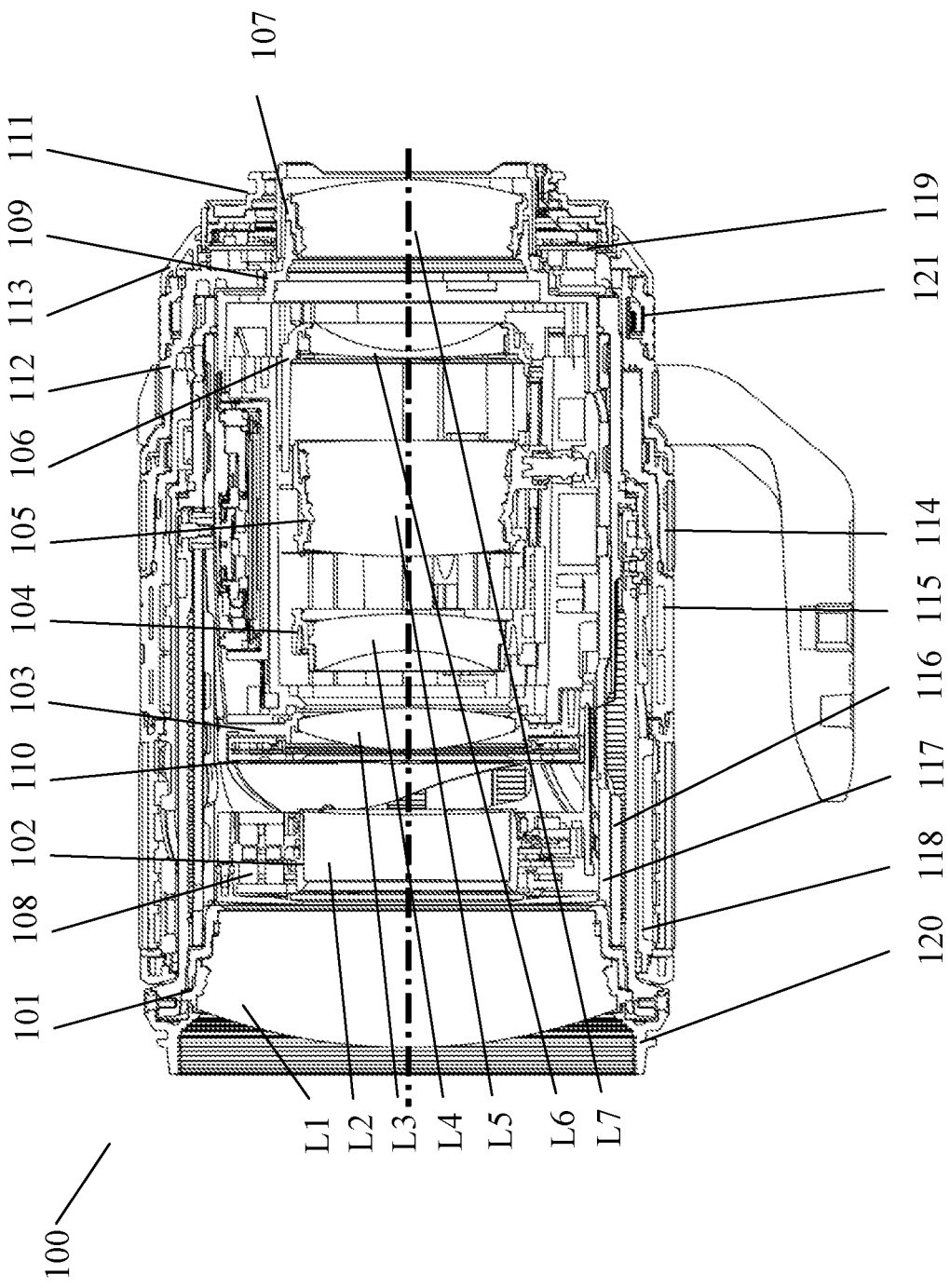
FIG. 2 is a sectional view of the interchangeable lens according to the first embodiment at a wide-angle end.
Figure 3:
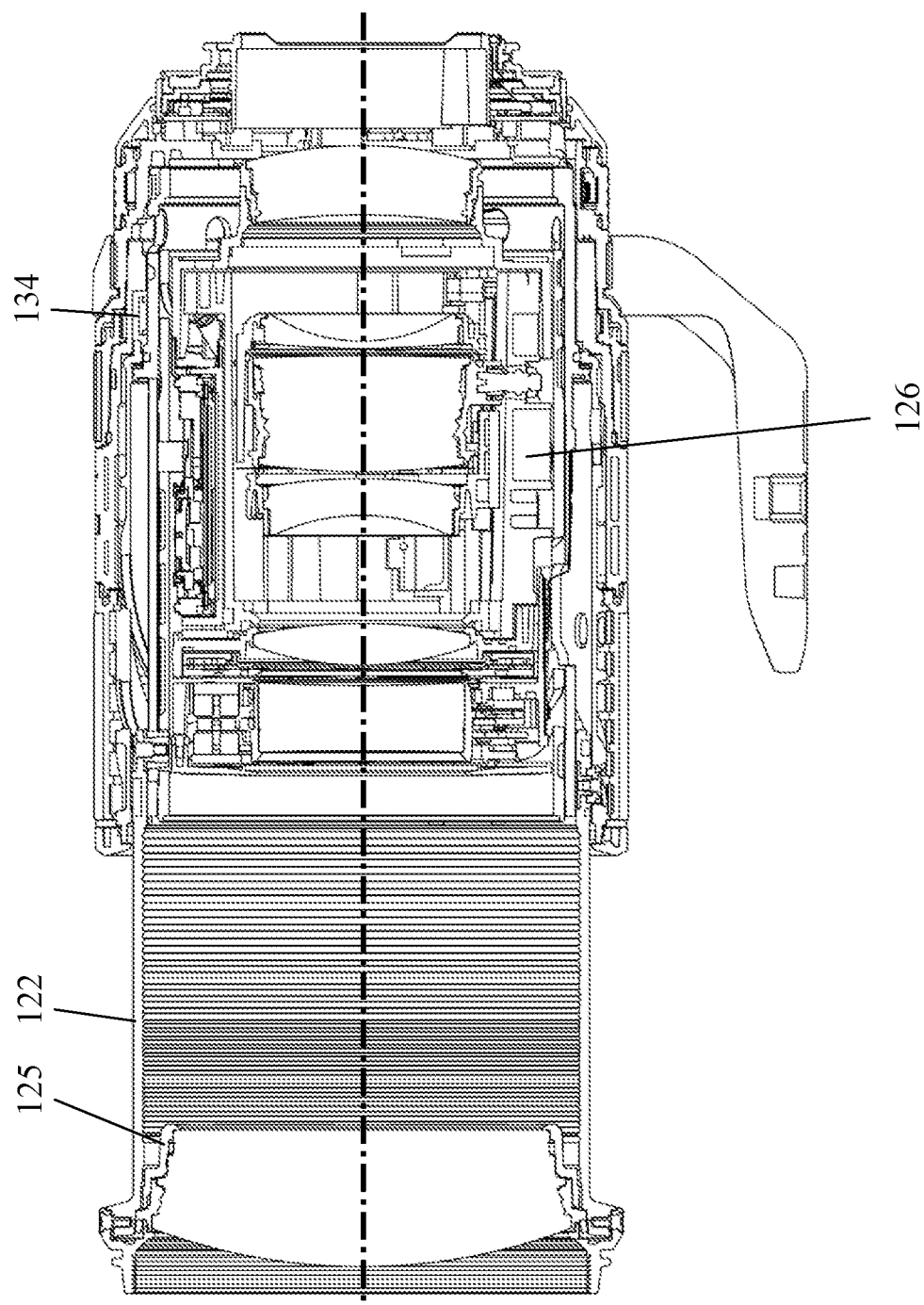
FIG. 3 is a sectional view of the interchangeable lens according to the first embodiment at a telephoto end.

FIGS. 2 and 3 illustrate a configuration of an interchangeable lens 100 as an optical apparatus (lens apparatus) according to a first embodiment of the present invention. FIG. 2 illustrates a section when the interchangeable lens 100 at the wide-angle end is cut parallel to an optical axis, and FIG. 3 illustrates a section when the interchangeable lens 100 at the telephoto end is cut parallel to the optical axis. The interchangeable lens 100 is attached to and a detachable from a camera body as an image pickup apparatus (not shown) including an image sensor such as a CCD sensor or a CMOS sensor.

The interchangeable lens 100 has an imaging optical system including first to seventh lens units L1 to L7 arranged in order from an object side (front side). The imaging optical system forms light from an unillustrated object to form an object image on an image sensor in a camera body. Focusing is performed by moving a floating lens unit as the fourth lens unit L4 and a focus lens unit as the sixth lens unit L6 in the optical axis direction, and zooming (magnification variation) is performed by moving the first to seventh lens units L1 to L7 in the optical axis direction. While the interchangeable lens is described in this embodiment, the optical apparatus may be a lens integrated image pickup apparatus.

A lens mount 111 has a bayonet part used to detachably attaching the interchangeable lens to the camera body, and is fixed onto a rear fixed barrel 112 with a screw via an exterior barrel 113. The exterior barrel 113 is sandwiched and fixed between the lens mount 111 and the rear fixed barrel 112. A front fixed barrel 115 is fixed onto the rear fixed barrel 112 with screws. A zoom index and operation switches (not shown) are attached to the front fixed barrel 115. A guide barrel 116 is fixed onto the rear fixed barrel 112 with screws.

The guide barrel 116 is formed with a linear groove for guiding each lens unit in the optical axis direction. The guide barrel 116 is provided with a cam groove portion, and a cam follower (not shown) screwed onto a cam barrel 117 is engaged with the cam groove portion. Thereby, the cam barrel 117 (linearly) moves in the optical axis direction while rotating around the optical axis during zooming. The cam barrel 117 is formed with a plurality of cam groove portions that linearly move the respective lens units that move during zooming.

A zoom operation barrel 118 is radially fitted to and bayonetted with the guide barrel 116 and rotatably held around the optical axis. The rotation of the zoom operation barrel 118 caused by the zoom operation by the user makes a rectilinear barrel 122 linearly move due to a rectilinear guiding function of the cam groove portion formed in the zoom operation barrel 118, the cam follower provided outside of the rectilinear barrel 122, and a rectilinear groove portion in the guide barrel 116. The cam follower of the rectilinear barrel 122 is also engaged with the cam groove portion in the cam barrel 117, so that as the rectilinear barrel 122 linearly moves, the cam barrel 117 rotates around the optical axis. At this time, the cam barrel 117 that is rotatable and linearly movable relative to the guide barrel 116 linearly moves while rotating due to the linear movement of the rectilinear barrel 122.

When the cam barrel 117 rotates and linearly moves relative to the guide barrel 116, the rear unit and the seventh unit are separately driven in the optical axis direction, because rear rollers 123 provided at three circumferential positions around the optical axis of the rear unit described later and the seventh unit roller 124 provided at three circumferential positions of the seventh unit described later are engaged with the rectilinear groove portions in the guide barrel 116 and the cam groove portions in the cam barrel 117.

Thus, in the interchangeable lens 100 according to this embodiment, the rectilinear barrel 122 linearly moves (and the first lens unit L1 fixed to the rectilinear barrel 122 moves in the optical axis direction as described later) when the zoom operation barrel 118 is rotated, and the second to seventh lens units L2 to L7 are moved in the optical axis direction when the cam barrel 117 is rotated and linearly moved.

The first lens holding frame 101 holds the first lens unit L1 and is fixed onto the rectilinear barrel 122 with screws. A first lens pressing ring 125 has a female screw formed on its inner peripheral portion and is screwed with a male screw formed on the outer peripheral portion of the rectilinear barrel 122. The first lens pressing ring 125 serves to fix the first lens unit L1.

A bayonet claw for attaching a hood is formed on the outer circumferential part of the rectilinear barrel 122, and a screw for attaching accessories such as a filter is formed on the inner circumferential part.

The second lens holding frame 102 holds the second lens unit L2 and constitutes part of an image stabilizing unit 108. The image stabilizing unit 108 holds the second lens holding frame 102 so that the second lens holding frame 102 is movable in a direction orthogonal to the optical axis (referred to as a shift direction hereinafter), and its shift actuator including a magnet and a coil drives the second lens holding frame 102 in the shift direction so as to reduce the image blurs. The image stabilizing unit 108 is held while suspended from the guide barrel 116 via rollers.

The third lens holding frame 103 holds the third lens unit L3, and is held by the rear unit base 126 via three cam followers (129 in FIG. 5) located at three circumferential positions of the third lens holding frame 103. The third lens holding frame 103 moves in the optical axis direction by the rear unit base 126 that linearly moves during zooming. The third lens holding frame 103 holds an electromagnetic diaphragm unit 110 including a plurality of diaphragm blades and a diaphragm actuator that opens and closes the diaphragm blades.

The fourth lens holding frame 104 serving as the first holding member holds the fourth lens unit L4 serving as the first optical element, and is linearly guided by a guide bar 153 serving as a first guide member whose front end and rear end are held by the rear unit base 126 and the first rear cover 127 fixed to the rear unit base 126. The fourth lens unit L4 (fourth lens holding frame 104) is moved in the same direction as that of the rear unit base 126 when the rear unit base 126 is moved in the optical axis direction during zooming, and is moved relative to the rear unit base 126 in the optical axis direction by the fourth lens driving motor unit 151 that serves as a first driver.

The fourth lens holding frame 104 has a scale for detecting the position in the optical axis direction. An optical sensor facing the scale is fixed to the rear unit base 126 via a flexible printed circuit board (FPC). The scale and the optical sensor constitute a position detector.

The fifth lens holding frame 105 serving as the third holding member holds the fifth lens unit L5 serving as the third optical element, and is held by the rear unit base 126 via three cam followers (holders) 159 fixed at three circumferential positions of the fifth lens holding frame 105. The fifth lens holding frame 105 is moved in the optical axis direction by the rear unit base 126 when the rear unit base 126 is linearly moved during zooming.

The sixth lens holding frame 106 as the second holding member holds the sixth lens unit L6 as the second optical element, and is linearly guided by the guide bar 155 as the second guide member whose front end and the rear end are held by the rear unit base 126 and the first rear unit cover 127.

The motor unit driving base 135 is attached to the rear unit base 126 movably in the optical axis direction, and is bayonetted with the seventh unit base 109 integrally only in the optical axis direction. The biasing force of the seventh unit spring 136 attached to the seventh unit base 109 removes play (looseness) in the optical axis direction between the seventh unit base 109 and the motor unit driving base 135.

The sixth lens holding frame 106 is driven in the optical axis direction relative to the motor unit driving base 135 by the sixth lens driving motor unit 152 as the second driver.

The seventh lens holding frame 107 holds the seventh lens unit L7 and is screwed with the seventh unit base 109. During zooming, the seventh lens holding frame 107 is driven in the optical axis direction together with the seventh unit base 109 by three cam followers provided on the seventh unit base 109. The seventh unit base 109 and the seventh lens holding frame 107 form a seventh unit.

This embodiment uses a vibration type linear motor using a piezoelectric element for the fourth lens driving motor unit 151 and the sixth lens driving motor unit 152. The vibration type linear motor includes a motor stator 130, a motor mover 131 that is excited by a piezoelectric element to move in the optical axis direction relative to the motor stator 130, and a motor output part that moves in the optical axis direction together with the motor mover 131. The motor stators 130 of the fourth lens driving motor unit 151 and the sixth lens driving motor unit 152 are fixed to the motor unit driving base 135. The motor unit driving base 135, together with the rear unit base 126, constitutes a base member that holds the fourth lens driving motor unit 151 and the sixth lens driving motor unit 152.

Figure 1:
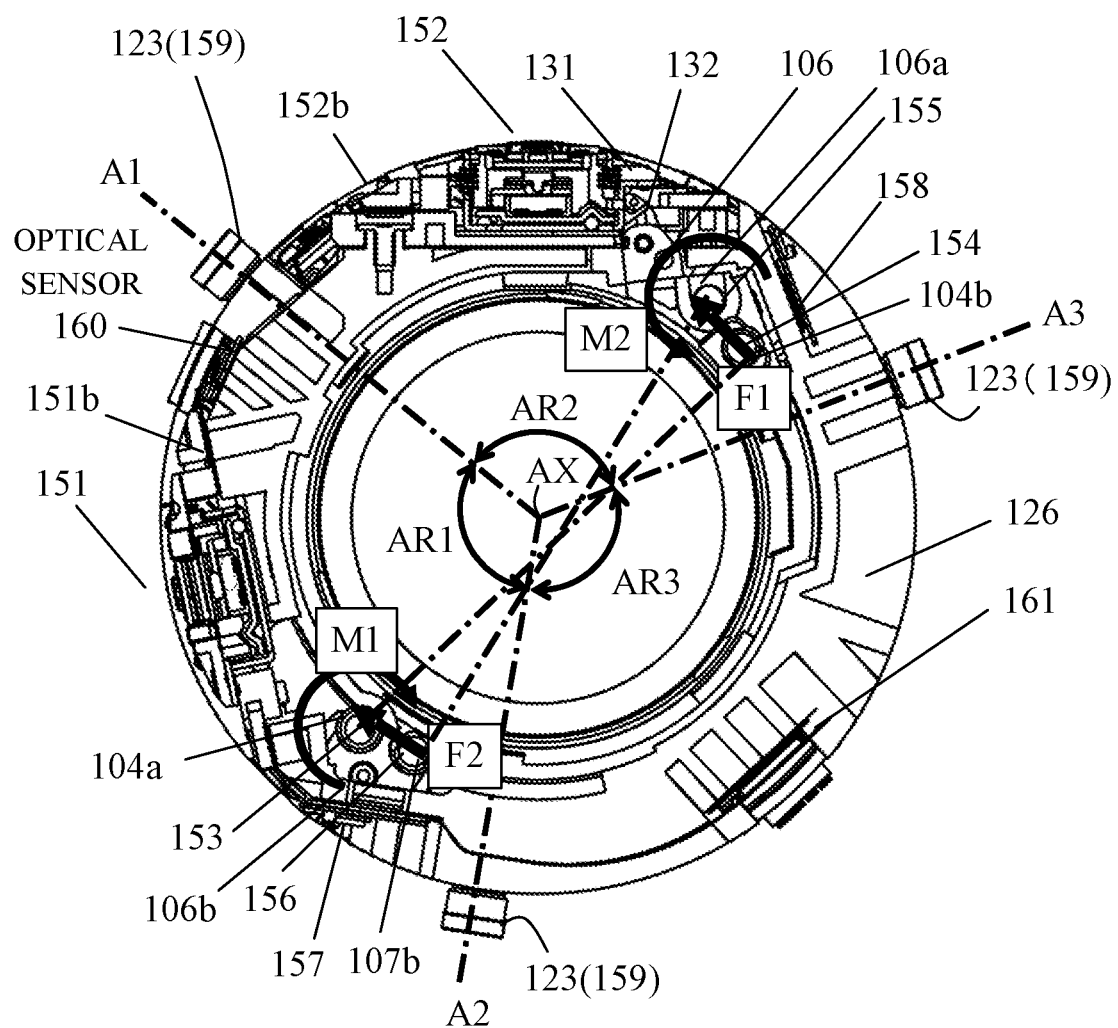
FIG. 1 is a sectional view of an interchangeable lens according to a first embodiment when it is viewed from an optical axis direction.
Figure 4:
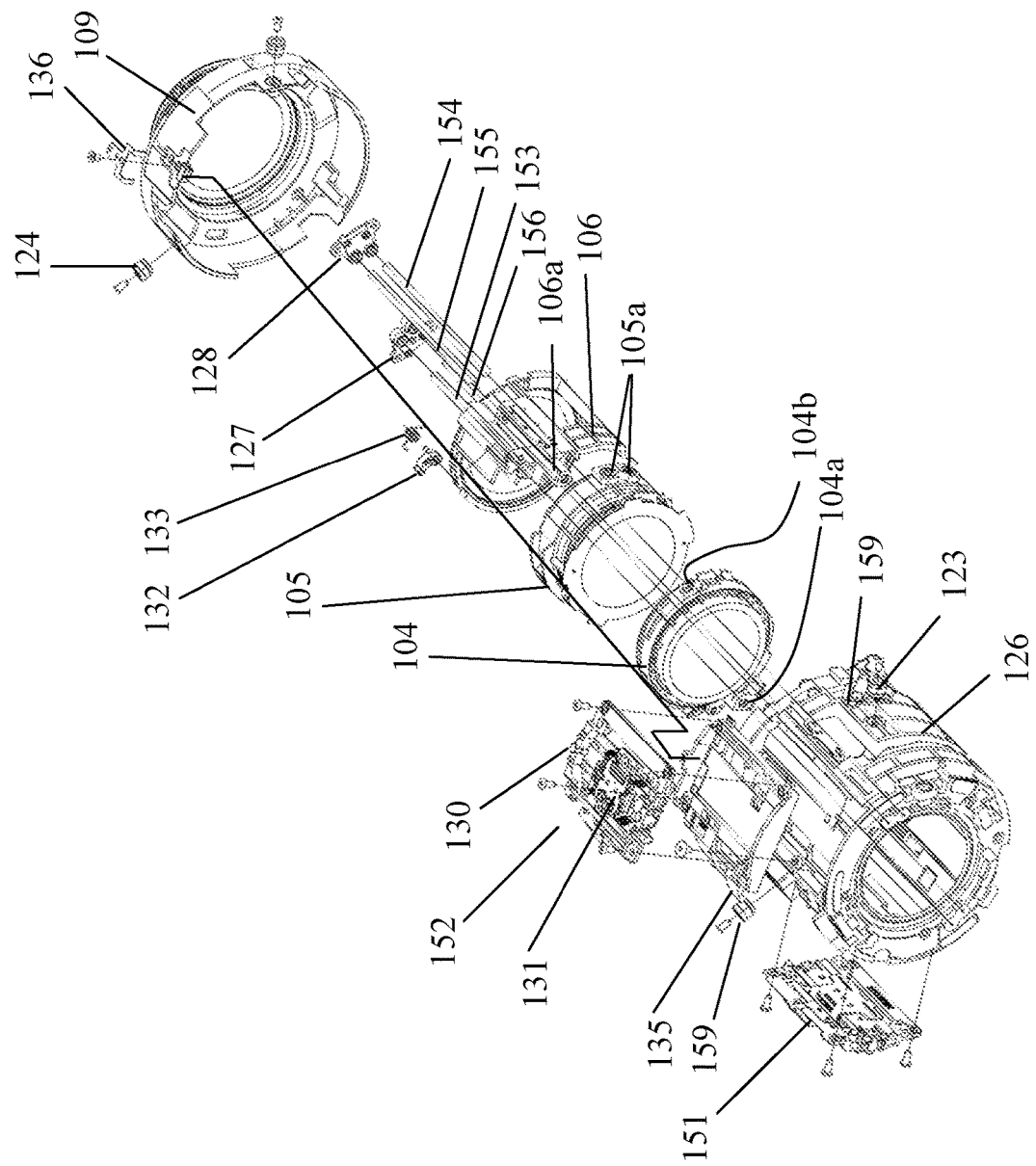
FIG. 4 is an exploded perspective view of the interchangeable lens according to the first embodiment.

An arm 132, which is a driving transmission member that transmits the driving forces from the motor output parts to the fourth lens holding frame 104 or the sixth lens holding frame 106, is engaged with each of the motor output parts of the fourth lens driving motor unit 151 and the sixth lens driving motor unit 152, as illustrated in FIG. 1 and FIG. 4 that is an exploded view of the rear unit. Thereby, the fourth lens driving motor unit 151 and the sixth lens driving motor unit 152 can drive the fourth lens holding member 104 and the sixth lens holding member 106 in the optical axis direction. However, FIGS. 1 and 4 illustrate only the arm 132 provided to the sixth lens holding frame 106.

A stepping motor may be used for each of the fourth lens driving motor unit 151 and the sixth lens driving motor unit 152, and the arm may be engaged with the lead screw provided to the motor output part. When the stepping motor is used, the position detector may be omitted to perform an open driving control.

The zoom operation barrel 118 is provided with a groove portion that holds a mover of a resistance type linear sensor (potentiometer) 134 that is an unillustrated zoom position detector fixed to the guide barrel 116. The zoom position can be detected by changing the output of the resistance type linear sensor 134 according to a rotating amount of the zoom operation barrel 118.

The focus operation barrel 114 is sandwiched between the front fixed barrel 115 and the rear fixed barrel 112 so that it can rotate at a fixed position in the optical axis direction on the outer circumference of the front fixed barrel 115. The rotation amount and direction of the focus operation barrel 114 are detected by a photodetector provided to the front fixed barrel 115 and a striped scale provided to the inner circumferential part of the focus operation barrel 114 so as to face the photodetector.

A multipurpose operation barrel 121 is sandwiched between the rear fixed barrel 112 and the exterior barrel 113 so that it can rotate at a fixed position in the optical axis direction on the outer circumference of the rear fixed barrel 112. The rotation amount and direction of the multipurpose operation barrel 121 are detected by a photodetector provided to the rear fixed barrel 112 and a striped scale provided to the inner circumferential part of the multipurpose operation barrel 121 opposite to the photodetector. In addition, the multipurpose operation barrel 121 and the rear fixed barrel 112 have a click mechanism including a plurality of groove portions for giving a click sense to a user operation and a click pin biased by a spring in the groove portions.

A lens controller (control board) 119 serving as a controller controls the entire operation of the interchangeable lens 100, such as a focus driving control, a diaphragm driving control, and an image stabilization control. During zooming, the lens controller 119 controls moving of the fourth lens unit L4 and the sixth lens unit L6 (or driving of the fourth lens driving motor unit 151 and the sixth lens driving motor unit 152) so as to keep below certain values the focus position and the amount of various aberrational amounts that fluctuate due to zooming. The lens controller 119 is fixed to the rear fixed barrel 112 with screws.

Figure 5:
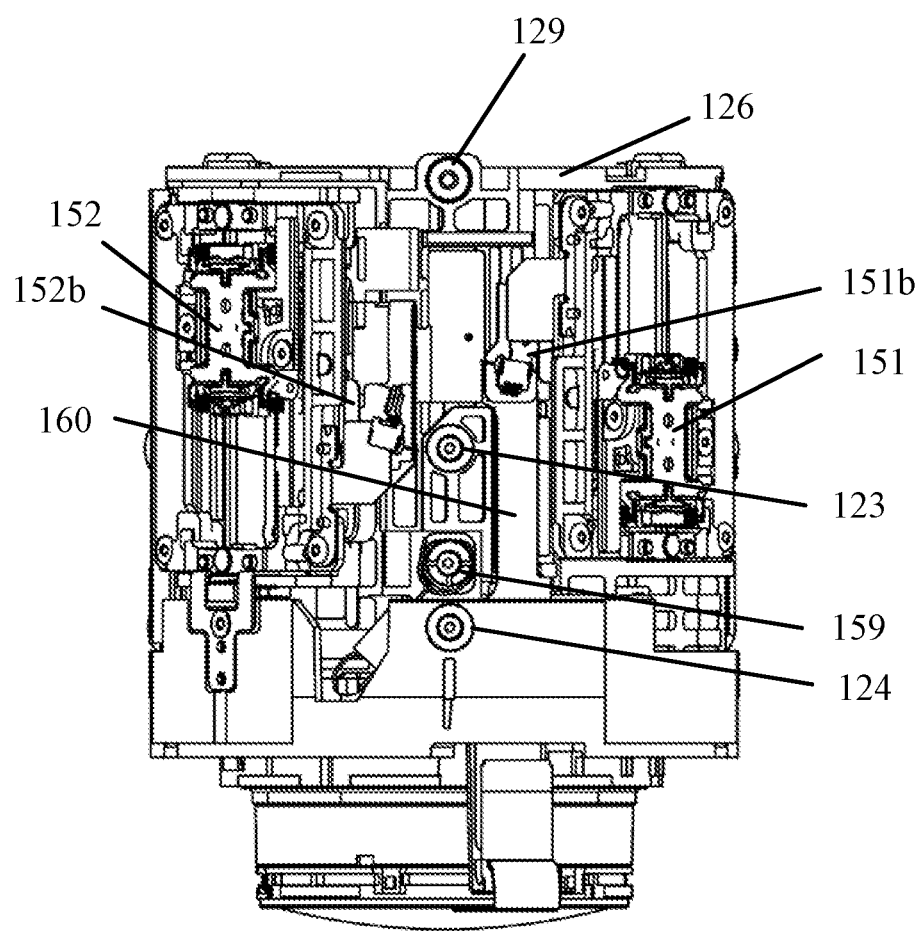
FIG. 5 illustrates the interchangeable lens according to the first embodiment when it is viewed from the direction of a first axis.

Referring now to FIGS. 1, 4 and 5, a description will be given of a more detailed configuration of the rear unit. FIG. 1 illustrates the rear unit viewed from the optical axis direction (front side). FIG. 4 illustrates the rear unit exploded as described above. FIG. 5 illustrates the rear unit viewed from the direction of a first axis which will be described later.

The third to sixth lens units L3 to L6 are held on the rear unit base 126 that linearly moves during zooming. However, FIG. 4 illustrates only the fourth to sixth lens units L4 to L6.

As described above, the fourth lens unit L4 held by the fourth lens holding frame 104 is a floating unit, and driven in the optical axis direction by the fourth lens driving motor unit 151. A sleeve portion 104a of the fourth lens holding frame 104 is engaged with (fitted to) the guide bar 153 movably in the optical axis direction at two positions before and after the sleeve portion 104a, and thereby the position of the fourth lens holding frame 104 is determined in a direction orthogonal to the optical axis and the fourth lens holding frame 104 is prevented from tilting relative to the optical axis. A U-groove portion 104b in the fourth lens holding frame 104 is engaged with a rotation stopping bar 154 as a first rotation stopping member movably in the optical axis direction. The front end of the rotation stopping bar 154 is held by the rear unit base 126, and its rear end is held by the second rear unit cover 128 fixed to the rear unit base 126.

The arm 132 rotatably attached to the fourth lens holding frame 104 is biased by a biasing force of a torsion spring (biasing unit) 133 disposed around its rotational center axis and engaged with the motor output part of the fourth lens driving motor unit 151. Thereby, the loose engagement of the arm 132 with the motor output part is removed. The biasing force of the torsion spring 133 biases the fourth lens holding frame 104 in a direction to rotate the fourth lens holding frame 104 around the guide bar 153, and brings the groove 104b into contact with the rotation stopping bar 154. Thereby, the rotational play of the fourth lens holding frame 104 is removed.

The position of the fourth lens holding frame 104 in the optical axis direction relative to the rear unit base 126 is detected by reading an unillustrated scale fixed to the fourth lens holding frame 104 through the fourth lens position sensor 157 as a first position detector fixed to the rear unit base 126.

As described above, the fifth lens holding frame 105 is held by the rear unit base 126 via the three cam followers 159 fixed to follower attachment portions 105a provided at three positions in the circumferential direction.

As described above, the sixth lens unit L6 held by the sixth lens holding frame 106 is the focus unit, and driven in the optical axis direction by the sixth lens driving motor unit 152. A sleeve portion 106a of the sixth lens holding frame 106 is engaged with (fitted to) the guide bar 155 movably in the optical axis direction at two positions before and after the sleeve portion 106a, and thereby the position of the sixth lens holding frame 106 is determined in a direction orthogonal to the optical axis and the sixth lens holding frame 106 is prevented from tilting relative to the optical axis. A U-groove portion 106b in the sixth lens holding frame 106 is engaged with the rotation stopping bar 156 as the second rotation stopping member movably in the optical axis direction. The front end of the rotation stopping bar 156 is held by the rear unit base 126, and its rear end is held by the second rear unit cover 128.

The arm 132 rotatably attached to the sixth lens holding frame 106 is biased by the biasing force of the torsion spring 133 disposed around the rotational center axis and engaged with the motor output part of the sixth lens driving motor unit 152. Thereby, the loose engagement of the arm 132 with the motor output part is removed. The biasing force of the torsion spring 133 biases the sixth lens holding frame 106 in a direction to rotate the sixth lens holding frame 106 around the guide bar 155, and brings the U-groove portion 106b into contact with the rotation stopping bar 156. Thereby, the rotational play (looseness) of the sixth lens holding frame 106 is removed.

The position of the sixth lens holding frame 106 in the optical axis direction relative to the rear unit base 126 is determined by the position of the motor unit driving base 135 relative to the rear unit base 126 and the position of the motor mover 131 of the sixth lens driving motor unit 152 relative to the motor unit driving base 135 in the optical axis direction. The position of the sixth lens holding frame 106 relative to the rear unit base 126 in the optical axis direction is detected by reading an unillustrated scale fixed to the sixth lens holding frame 106 through a sixth lens position sensor 158 as a second position detector fixed to the rear unit base 126.

In the description of this embodiment, the fourth lens unit L4 is the floating unit and the sixth lens unit L6 is the focus unit, and these lens units are moved during focusing, but one of these lens units may be moved during zooming and the other lens unit may be moved during focusing. In the description of this embodiment, the sixth lens unit L6 is moved relative to the motor unit driving base 135, but the motor unit driving base 135 may be omitted.

Referring now to FIG. 1, a description will be given of an arrangement of the components in the rear unit. A first axis A1, a second axis A2, and a third axis A3 illustrated in FIG. 1 pass through a position of an optical axis AX, and are straight lines that pass through the center of three cam followers 159 that cause the rear unit base 126 to hold the fifth lens holding frame 105. The three cam followers 159 are arranged at intervals of approximately 120 degrees in the circumferential direction. Thus, the angles formed by the adjacent axes in the circumferential direction among the first to third axes A1, A2 and A3 are also approximately 120 degrees.

In this embodiment, since the three cam followers 159 that cause the rear lens unit base 126 to hold the fifth lens holding frame 105 and the three rear unit rollers (holders) 123 that cause the guide barrel (other member) 116 to hold the rear lens unit base 126 (or the rear lens unit) are arranged at the same phases, the first axis A1, the second axis A2, and the third axis A3 when viewed from the optical axis direction are straight lines that pass through the optical axis AX and pass through the centers of the three rear unit rollers 123.

In the circumferential direction, an area sandwiched between the first and second axes A1 and A2 will be set to a first area AR1, and an area sandwiched between the first and third axes A1 and A3 will be set to a second area AR2. An area sandwiched by the second and third axes A2 and A3 will be set to a third area AR3.

Arranged in the first area AR1 are the fourth lens driving motor unit 151, the arm 132 provided to the fourth lens holding frame 104, the torsion spring 133 for biasing the arm 132, and the guide bar 153 for guiding the fourth lens holding frame 104. The guide bar 153 is disposed at a position distant from the first axis A1 than the fourth lens driving motor unit 151. Arranged in the first area AR1 are a rotation stopping bar 156 that stops rotating the sixth lens holding frame 106 near the guide bar 153 (or farther from the first axis A1 than the fourth lens driving motor unit 151).

Arranged in the second area AR2 are the sixth lens driving motor unit 152, a latch 132 provided to the sixth lens holding frame 106, the torsion spring 133 for biasing the same, and the guide bar 155 for guiding the sixth lens holding frame 106. The guide bar 155 is disposed at a position distant from the first axis A1 than the sixth lens driving motor unit 152. Arranged in the second area AR2 is the rotation stopping bar 154 that stops rotating the fourth lens holding frame 104 near the guide bar 155 (or farther from the first axis A1 than the sixth lens driving motor unit 152).

In this embodiment, the fourth and sixth lens units L4 and L6 driven by the fourth and sixth lens driving motor units 151 and 152 respectively sandwich the fifth lens unit L5 therebetween but are close to each other in the optical axis direction. As described above, such a lens unit arrangement arranges the fourth lens driving motor unit 151 and the sixth lens driving motor unit 152 in the first area AR1 and the second area AR2, respectively, which are areas different from each other in the circumferential direction and thereby can arrange, as illustrated in FIGS. 1 and 5, the fourth lens driving motor unit 151 and the sixth lens driving motor unit 152 in two areas that at least partially overlap each other in the optical axis direction. Thereby, the rear unit (or finally the interchangeable lens 100) can be made smaller in the optical axis direction than that where the fourth lens driving motor unit 151 and the sixth lens driving motor unit 152 are arranged in two areas that do not overlap each other at all in the optical axis direction.

By disposing the lens driving motor unit and relevant components (the arm 132, the torsion spring 133, and the guide bars 153 and 155) in each of the first area AR1 and the second area AR2, the follower attachment portion 105*a*, to which the cam follower 159 for holding the fifth lens holding frame 105 is attached, can be disposed near the boundary of each area, and the follower attachment portion 105*a* can be secured without increasing the size of the interchangeable lens 100.

As described above, this embodiment can make compact the interchangeable lens 100 having the fourth and sixth lens driving motor units 151 and 152 for driving the fourth and sixth lens units L4 and L6.

In this embodiment, the fourth lens driving motor unit 151 and relevant components, and the sixth lens driving motor unit 152 and relevant components are arranged in line symmetry with respect to the first axis A1. The term "arranged in line symmetry," as used herein, includes both an arrangement in perfect line symmetry and an arrangement that can be considered to be in substantially line symmetry. FIG. 1 illustrates a moment M1 generated in the fourth lens holding frame 104 by the biasing force of the torsion spring 133 for biasing the arm 132 provided to the fourth lens holding frame 104 and a moment M2 generated in the sixth lens holding frame 106 by the biasing force of the torsion spring 133 for biasing the arm 132 provided to the sixth lens holding frame 106. FIG. 1 also illustrates a reaction force F1 received by the U-groove portion 104*b* of the fourth lens holding frame 104 by the moment M1 and a reaction force F2 received by the U-groove portion 106*b* of the sixth lens holding frame 106 by the moment M2.

A direction of the reaction force F1 is a direction orthogonal to a straight line that connects the guide bar 153 and the U-groove portion 104*b* in the fourth lens holding frame 104, and a direction of the reaction force F2 is a direction orthogonal to a straight line that connects the guide bar 155 and the U-groove portion 106*b* in the sixth lens holding frame 106. Therefore, the reaction forces F1 and F2 can work in the same direction when the arm 132, the torsion spring 133, and the U-groove portions 104*b* and 106*b* relevant to the fourth and sixth lens holding frames 104 and 106 are arranged in line symmetry with respect to the first axis A1. The same direction, as used herein, is not limited to completely the same (parallel) direction, but may be a nonparallel direction that can be regarded as substantially the same direction.

If the biasing force of the torsion spring 133 is smaller than the own weight of the lens unit and the lens holding frame, there will be the play in holding the lens holding frame, but the reaction forces F1 and F2 working in the same direction eliminate the need to generate a strong biasing force only in one torsion spring 133. It is thus unnecessary to use a large spring or to thicken a guide bar in order to secure the strength against the large load generated by a strong biasing force, and the interchangeable lens 100 can be made compact. In addition, it is possible to avoid a large frictional force between the guide bar and the lens holding frame (sleeve portion and U-groove portion) due to the large load, and it is unnecessary to increase the driving force of the lens driving motor unit or the size of the lens driving motor unit. Therefore, the interchangeable lens 100 can save power and can be made compact.

In order to match the directions of the reaction forces F1 and F2, the guide bar 153 for the fourth lens holding frame 104 and the rotation stopping bar 156 for the sixth lens holding frame 106 may be brought close to each other, and the guide bar 155 for the sixth lens holding frame 106 and the rotation stopping bar 154 for the fourth lens holding frame 104 may be brought close to each other. Moreover, one guide bar may be shared as the guide bar 153 for the fourth lens holding frame 104 and the rotation stopping bar 156 for the sixth lens holding frame 106, and the other one guide bar may be shared as the guide bar 155 for the sixth lens holding frame 106 and the rotation stopping bar 154 for the fourth lens holding frame 104.

This embodiment disposes the flexible printed circuit board 160 as the first connecting member that connects the fourth and sixth lens driving motor units 151 and 152 to the lens controller 119 so as to extend in the optical axis direction near the first axis A1. More specifically, as illustrated in FIGS. 1 and 5, the connector 151b of the fourth lens driving motor unit 151 and the connector 152b of the sixth lens driving motor unit 152 extend toward the flexible printed circuit board 160 disposed on the first axis A1 side in their circumferential directions and are connected to the flexible printed circuit board 160.

In order to enable such connections, this embodiment uses motor units having the same structure for the fourth lens driving motor unit 151 and the sixth lens driving motor unit 152, and arranges them back to front. This eliminates the need to use separate motor units for the fourth and sixth lens driving motor units 151 and 152. Since the fourth and sixth lens driving motor units 151 and 152 and the lens controller 119 can be connected by the single flexible printed circuit board 160, the connecting space can be saved and the interchangeable lens 100 can be made compact.

This embodiment disposes the flexible printed circuit board 161 as the second connecting member that connects the fourth lens position sensor 157 and the sixth lens position sensor 158 to the lens controller 119, in the third area AR3 that is a phase area opposite to the first axis A1 in FIG. 1. Since the third area AR3 has a space wider than the first and second areas AR1 and AR2 in which the fourth and sixth lens driving motor units 151 and 152 and the like are arranged, the flexible printed circuit board 161 can be disposed in the third area AR3 different from the first and second areas AR1 and AR2 and thus a reasonable arrangement can be realized. Moreover, since the fourth and sixth lens position sensors 157 and 158 can be connected to each other through the single flexible printed circuit board 161, the connecting space can be reduced and the interchangeable lens 100 can be made compact.

The first to third axes A1, A2, and A3 do not have to be straight lines passing through the centers of the three cam followers 159 in order to hold the fifth lens unit L5. For example, this embodiment arranges the three cam followers 159 and the three rear unit rollers 123 in the same phases, but may arrange the three rear unit rollers 123 in phases different from those of the three cam followers 159 and set the axes passing through the centers of the rollers 123 to the first to third axes. Instead of holding by the cam follower, holding by using a fixing member such as a screw may be used.

One modification of the above embodiment may allow the connectors 151b and 152b of the fourth and sixth lens driving motor units 151 and 152 to extend in the circumferential direction to the side opposite to the first axis A1 side. In this case, the connector 151b of the fourth lens driving motor unit 151 and the fourth lens position sensor 157 are connected to the flexible printed circuit board, and this is connected to the lens controller 119. Alternatively, the connector 152b of the sixth lens driving motor unit 152 and the sixth lens position sensor 158 are connected to another flexible printed circuit board, which is connected to the lens controller 119. However, the connection in the above embodiment is suitable when the influence of noises generated by driving the fourth and sixth lens driving motor units 151 and 152 on the signals from the fourth and sixth lens position sensors 157 and 158.

Second Embodiment

Figure 6:
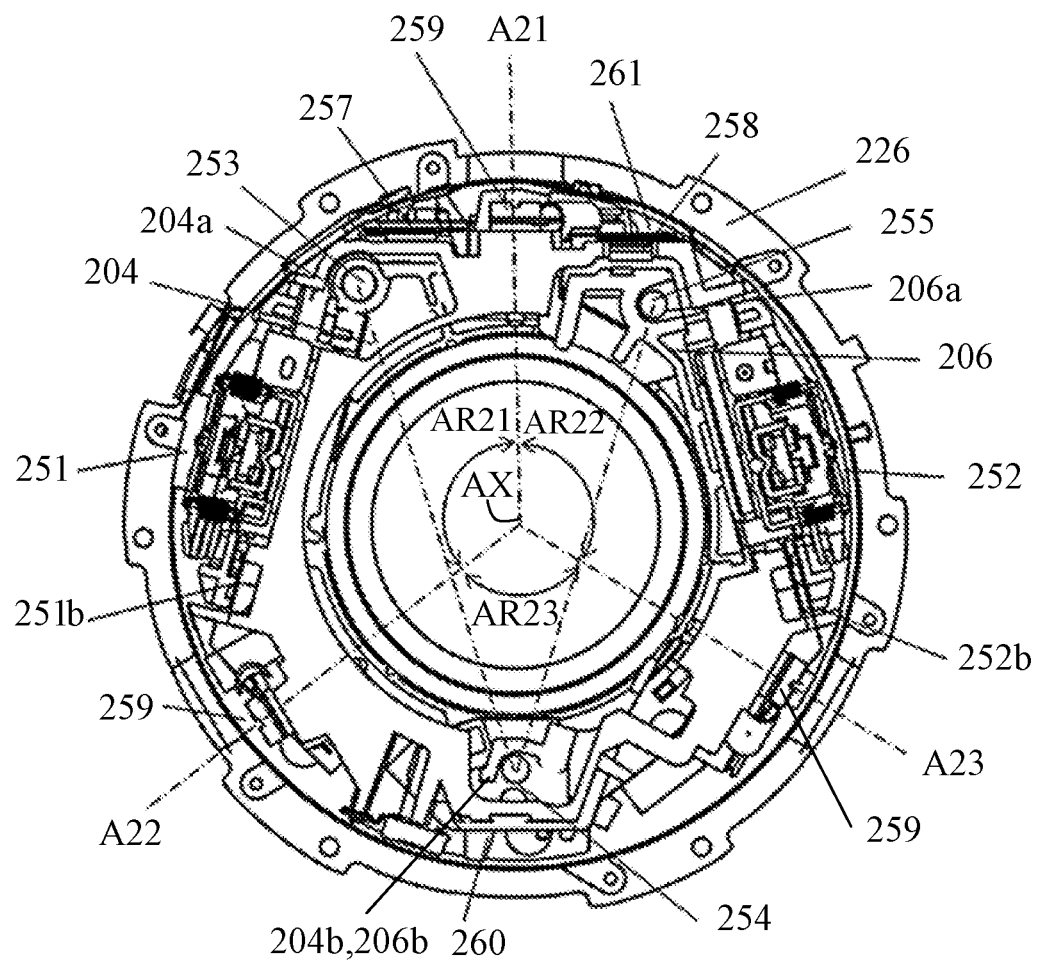
FIG. 6 is a sectional view of an interchangeable lens according to a second embodiment when it is viewed from the optical axis direction.

FIG. 6 illustrates a section viewed from the optical axis direction of an interchangeable lens according to a second embodiment of the present invention. Those elements in the interchangeable lens according to this embodiment, which are corresponding elements in the first embodiment, will be designated by reference numerals of the 200s with the last two digits of the reference numeral 100s of the first embodiment are the same. A first axis A21, a second axis A22, and a third axis A23 illustrated in FIG. 6 pass through the optical axis AX, and are straight lines that pass through the centers of the three cam followers 259 that cause the rear base 226 to hold the fifth lens unit, which is disposed between the fourth and sixth lens units. The three cam followers 259 are arranged at intervals of approximately 120 degrees in the circumferential direction. Therefore, the angles formed by the adjacent axes in the circumferential direction among the first to third axes A21, A22 and A23 are also approximately 120 degrees. In the circumferential direction, an area sandwiched between the first and second axes A21 and A22 will be set to a first area AR21, and an area sandwiched between the first and third axes A21 and A23 will be set to a second area AR22. An area sandwiched by the second and third axes A22 and A23 will be set to a third area AR23.

In this embodiment, the arrangement relationship between the fourth and sixth lens driving motor units and the guide bar is opposite to that of the first embodiment. More specifically, in the first embodiment, the guide bars 153 and 155 are located at positions farther from the first axis A1 than the fourth and sixth lens driving motor units 151 and 152 in the first and second areas AR1 and AR2, respectively. On the other hand, in this embodiment, the fourth and sixth lens driving motor units 251 and 252 are located in the first and second areas AR21 and AR22, and the guide bars 253 and 255 are located at positions closer to the first axis A21 than the sixth lens driving motor units 251 and 252 in the fourth and sixth areas AR21 and AR22. The fourth lens position sensor 257 and the sixth lens position sensor 258 are also located near the first axis A21 in accordance with the arrangement of the guide bars 253 and 255.

The front ends of the guide bars 253 and 254 that guide the fourth lens holding frame 204 are held by the rear unit base 226, and their rear ends are held by an unillustrated rear unit cover fixed to the rear unit base 226. The sleeve portion 204a of the fourth lens holding frame 204 is engaged with the guide bar 253, and the U-groove portion 204b is engaged with the rotation stopping bar 254 disposed in the third area AR23.

On the other hand, the front end of the guide bar 255 that guides the sixth lens holding frame 206 is held by the rear unit base 226, and its rear end is held by the rear unit cover. The sleeve portion 206a of the sixth lens holding frame 206 is engaged with the guide bar 255, and the U-groove portion 206b is engaged with the rotation stopping bar 254, similar to the U-groove portion 204b of the fourth lens holding frame 204. In other words, this embodiment uses the rotation stopping bar 254, which is the same member (single unit), for the first rotation stopping member and the second rotation stopping member.

Similar to the first embodiment, an arm that is engaged with the motor mover of the fourth lens driving motor unit 251 and a torsion spring that biases this arm are disposed in the first area AR21. An arm that is engaged with the motor mover of the sixth lens driving motor unit 252 and a torsion spring that biases the arm are disposed in the second area AR22.

By thus disposing the lens driving motor unit and relevant components (arm, torsion spring, and guide bar 253 and 255) in the first area AR21 and the second area AR22, respectively, the follower attachment portion "a" to which the cam follower 259 for holding the lens holding frame 205 is attached can be disposed near the boundary between the areas, and the follower attachment portion can be secured without increasing the size of the interchangeable lens.

Even in this embodiment, the interchangeable lens having the fourth and sixth lens driving motor units 251 and 252 for driving the fourth and sixth lens units can be made compact.

This embodiment may dispose near the first axis A21, the flexible printed circuit board 261 that connects the fourth lens position sensor 257, the sixth lens position sensor 258, and the unillustrated lens controller. This embodiment may dispose the flexible printed circuit board 260 that connects the fourth and sixth drive motor units 251 and 252 to the lens controller, in the third area AR23, which is the phase area on the opposite side of the first axis A21. This allows a space-saving arrangement.

In the description of each embodiment, each motor unit drives a lens as an optical element, but an optical element other than a lens such as a diaphragm may be driven.

The above embodiments can make compact an optical apparatus having a plurality of drivers for driving a plurality of optical elements.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-190709, filed on Oct. 18, 2019, which is hereby incorporated by reference herein in its entirety.

What is claimed is:

1. An optical apparatus comprising:
   a plurality of optical elements arranged in an optical axis direction;
   a first holding member and a second holding member configured to hold a first optical element and a second optical element, respectively, among the plurality of optical elements;
   a first guide member and a second guide member configured to guide movements of the first holding member and the second holding member, respectively, in the optical axis direction;
   a first driver and a second driver configured to drive the first holding member and the second holding member, respectively, in the optical axis direction;
   a base member configured to hold the first driver and second driver; and
   holders configured to cause the base member to hold a third holding member that holds a third optical element among the plurality of optical elements, and provided at three locations in a circumferential direction around an optical axis when viewed in a cross section perpendicular to the optical axis,
   wherein where a first axis, a second axis, and a third axis are defined as axes passing through the optical axis and the holders at the three locations, the first driver and the first guide member are disposed in a first area between the first axis and the second axis, and the second driver and the second guide member are disposed in a second area between the first axis and the third axis, and
   wherein the first driver and second driver are disposed in two areas that at least partially overlap each other in the optical axis direction.

2. The optical apparatus according to claim 1, wherein when viewed in the cross section perpendicular to the optical axis, the first guide member in the first area is farther from the first axis than the first driver and the second guide member in the second area is farther from the first axis than the second driver.

3. The optical apparatus according to claim 2, wherein when viewed in the cross section perpendicular to the optical axis, a pair of the first driver and the first guide member, and a pair of the second driver and the second guide member are disposed symmetrical with respect to the first axis.

4. The optical apparatus according to claim 3, wherein when viewed in the cross section perpendicular to the optical axis, the first guide member and the second rotation stopping member in the first area are farther from the first axis than the first driver, and the second guide member and the first rotation stopping member in the second area are farther from the first axis than the second driver.

5. The optical apparatus according to claim 1, wherein when viewed in the cross section perpendicular to the optical axis, the first guide member in the first area is closer to the first axis than the first driver and the second guide member in the second area is closer to the first axis than the second driver.

6. The optical apparatus according to claim 1, comprising:
   a first rotation stopping member configured to stop rotating the first holding member around the first guide member; and
   a second rotation stopping member configured to stop rotating the second holding member around the second guide member,
   wherein when viewed in the cross section perpendicular to the optical axis, the first rotation stopping member is disposed in the second area, and the second rotation stopping member is disposed in the first area.

7. The optical apparatus according to claim 6, wherein when viewed in the cross section perpendicular to the optical axis, the first guide member and the second rotation stopping member in the first area are closer to the first axis than the first driver, and the second guide member and the first rotation stopping member in the second area are closer to the first axis than the second driver.

8. The optical apparatus according to claim 6, further comprising a biasing unit configured to bias the first holding member and the second holding member so as to rotate the first holding member and the second holding member around the first guide member and the second guide member, respectively,
wherein when viewed in the cross section perpendicular to the optical axis, a reaction force that the first holding member biased by the biasing unit receives from the first rotation stopping member, and a reaction force that the second holding member biased by the biasing unit receives from the second rotation stopping member work in the same direction.

9. The optical apparatus according to claim 6, wherein the first rotation stopping member and the second rotation stopping member are disposed as a single unit in a third area between the second axis and the third axis.

10. The optical apparatus according to claim 1, further comprising:
a first connecting member configured to connect the first driver and the second driver to a controller configured to control the first driver and second driver;
a first position detector and a second position detector configured to detect positions of the first holding member and the second holding member, respectively; and
a second connecting member configured to connect the first position detector and the second position detector to the controller,
wherein when viewed in the cross section perpendicular to the optical axis, the first connecting member and the second connecting member are located in different areas among the first area, the second area, and a third area between the second axis and the third axis.

11. The optical apparatus according to claim 1, wherein the optical apparatus is attachable to and detachable from an image pickup apparatus.

12. The optical apparatus according to claim 1, further comprising an image sensor configured to receive light from the optical elements.

13. An optical apparatus comprising:
a plurality of optical elements arranged in an optical axis direction;
a first holding member and a second holding member configured to hold a first optical element and a second optical element, respectively, among the plurality of optical elements;
a first guide member and a second guide member configured to guide movements of the first holding member and the second holding member, respectively, in the optical axis direction;
a first driver and a second driver configured to drive the first holding member and the second holding member, respectively, in the optical axis direction;
a base member configured to hold the first driver and second driver; and
holders configured to cause another member to hold the base member, and provided at three locations in a circumferential direction around an optical axis when viewed in a cross section perpendicular to the optical axis,
wherein where a first axis, a second axis, and a third axis are defined as axes passing through the optical axis and the holders at the three locations, the first driver and the first guide member are disposed in a first area between the first axis and the second axis, and the second driver and the second guide member are disposed in a second area between the first axis and the third axis,
wherein when viewed in a cross section perpendicular to the optical axis, the first guide member in the first area is farther from the first axis than the first driver and the second guide member in the second area is farther from the first axis than the second driver, and
wherein the first driver and second driver are disposed in two areas that at least partially overlap each other in the optical axis direction.

14. The optical apparatus according to claim 13, wherein when viewed in the cross section perpendicular to the optical axis, a pair of the first driver and the first guide member, and a pair of the second driver and the second guide member are disposed symmetrical with respect to the first axis.

15. The optical apparatus according to claim 13, comprising:
a first rotation stopping member configured to stop rotating the first holding member around the first guide member; and
a second rotation stopping member configured to stop rotating the second holding member around the second guide member,
wherein when viewed in the cross section perpendicular to the optical axis, the first rotation stopping member is disposed in the second area, and the second rotation stopping member is disposed in the first area.

16. An optical apparatus comprising:
a plurality of optical elements arranged in an optical axis direction;
a first holding member and a second holding member configured to hold a first optical element and a second optical element, respectively, among the plurality of optical elements;
a first guide member and a second guide member configured to guide movements of the first holding member and the second holding member, respectively, in the optical axis direction;
a first driver and a second driver configured to drive the first holding member and the second holding member, respectively, in the optical axis direction;
a base member configured to hold the first driver and second driver; and
holders configured to cause another member to hold the base member, and provided at three locations in a circumferential direction around an optical axis when viewed in a cross section perpendicular to the optical axis,
wherein where a first axis, a second axis, and a third axis are defined as axes passing through the optical axis and the holders at the three locations, the first driver and the first guide member are disposed in a first area between the first axis and the second axis, and the second driver and the second guide member are disposed in a second area between the first axis and the third axis,
wherein when viewed in the cross section perpendicular to the optical axis, the first guide member in the first area is closer to the first axis than the first driver and the second guide member in the second area is closer to the first axis than the second driver, and
wherein the first driver and second driver are disposed in two areas that at least partially overlap each other in the optical axis direction.

17. The optical apparatus according to claim 16, wherein when viewed in the cross section perpendicular to the optical axis, a pair of the first driver and the first guide member, and a pair of the second driver and the second guide member are disposed symmetrical with respect to the first axis.

18. The optical apparatus according to claim 16, comprising:
   a first rotation stopping member configured to stop rotating the first holding member around the first guide member; and
   a second rotation stopping member configured to stop rotating the second holding member around the second guide member,
   wherein when viewed in the cross section perpendicular to the optical axis, the first rotation stopping member is disposed in the second area, and the second rotation stopping member is disposed in the first area.

* * * * *